Patented Apr. 10, 1951

2,548,687

UNITED STATES PATENT OFFICE 2,548,687

PRODUCTION OF FUMARIC ACID

Sydney M. Spatz, Buffalo, N. Y., assignor to Allied Chemical & Dye Corporation, New York, N. Y., a corporation of New York No Drawing. Application September 24, 1947, Serial No. 775,955

13 Claims. (Cl. 260—537)

This invention relates to a process for producing fumaric acid and more particularly refers to a process for isomerizing maleic acid to fumaric acid.

In commercial production of maleic anhydride, for example by vapor-phase catalytic oxidation of benzene, there are unavoidably produced substantial quantities of aqueous maleic acid which, for maximum economy, require work-up into salable finished products. Some suitable outlets exist for the disposal of this material, such as serving as raw material for the production of malic acid or of succinic acid by the electrolytic or chemical reduction processes, but these are limited as to amount. The material can be thermally dehydrated by flash vaporization to maleic anhydride, but material thus produced is expensive in comparison with directly condensed maleic anhydride. Maleic acid can also be converted to fumaric acid by the conventional method of inverting with the use of hydrohalic acids but this requires special acid-resistant equipment and either quite concentrated solutions or the availability of hydrogen chloride gas to avoid uneconomical dilutions.

The primary object of this invention is to provide a simple method of converting aqueous maleic acid into the readily-handled, isolatable and salable fumaric acid which process requires no special equipment and is not characterized by the development of noxious gases or toxic compounds.

Other objects and advantages of the invention will appear hereinafter.

The present invention comprehends a new and improved process for the inversion of maleic acid to fumaric acid, which comprises treating an aqueous solution of maleic acid, which may be partially suspended, with thiourea or a derivative thereof in which not more than 3 of the hydrogen atoms of thiourea are substituted by similar or dissimilar organic radicals which together may form a ring structure. The invention is particularly directed to use for this purpose of inversion agents represented by the general formula:

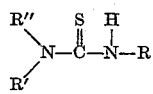

wherein the radicals R, R' and R'' are members of the group consisting of hydrogen, acyclic and cyclic hydrocarbon radicals, and acyl groups of the type R'''CO, in which R''' is a hydrocarbon radical, the sum of carbon atoms in the radicals R, R' and R'' being 8 or less.

Representative examples of such inversion agents are:

1. 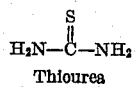
Thiourea

2. 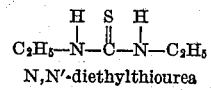
N,N'-diethylthiourea

3. 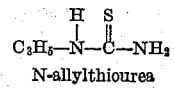
N-allylthiourea

4. 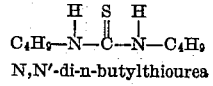
N,N'-di-n-butylthiourea

5. 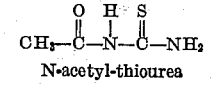
N-acetyl-thiourea

6. 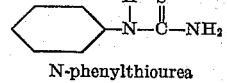
N-phenylthiourea

The above are merely exemplary of the types of compounds which may be employed in accordance with the invention. Thus the invention extends to the use of N,N'-dimethylthiourea, trimethylthiourea, triethylthiourea, N-propionylthiourea and N-butyryl-thiourea and the remaining compounds falling within the purview of the above general formula, as inversion agents for conversion of maleic acid to fumaric acid.

The preferred agents are thiourea and N-substituted thioureas in which not more than 2 hydrogen atoms of urea are replaced by aliphatic hydrocarbon radicals, each containing not more than 3 carbon atoms.

An important advantage of the invention is that inversion agents of this outstanding group effect conversions of maleic acid to fumaric acid to the extent of 80% or more at relatively low temperatures and at low concentrations of maleic acid and do so rapidly at higher temperatures and higher acid concentrations.

In carrying out the invention, the inversion rate of maleic acid to fumaric acid is influenced by the concentration of the maleic acid solution, the temperature of the reaction mixture, the concentration of the inversion agent in maleic acid solution, and the duration of the inversion reaction. Thus I may employ aqueous maleic acid of a concentration of from about 10% to about 75% (by weight) and temperatures of from about room temperature (30° C.) to about 110° C.; preferably, maleic acid concentrations from about 20% to about 60% (by weight) and temperatures from about 70° to about 100° C. are utilized in order to effect rapid conversion of maleic acid to fumaric acid. Higher temperatures necessitating use of pressure equipment are unnecessary.

Only small amounts of the inversion agents of the invention are required to convert maleic acid to fumaric acid. I prefer to employ from about 0.01 to about 0.1 mol of inversion agent per mol of maleic acid initially contained in the aqueous maleic acid liquor. The maleic acid, particularly when produced by catalytic vapor-phase oxidation of compounds such as benzene, may contain impurities which inactivate a portion of the inversion agent. When such impure maleic acid is uitlized the amount of inversion agent employed should be sufficient to provide from 0.01 to 0.1 mol per mol of maleic acid in excess of the amount of the agent which is inactivated by the impurities. Although smaller proportions of inversion agent may be employed, they provide a rate of conversion which is considered unduly slow for commercial operations even when elevated temperatures and concentrated maleic acid solutions are used. When quantities of inversion agent in excess of the preferred range are used, the rate of conversion of maleic acid to fumaric acid is increased, but this advantage is more than offset by the increased cost of inversion agent as well as the formation of excessive amounts of impurities such as pseudo thiohydantoin acetic acid which is produced by the more vigorous reaction. Pseudo-thiohydantoin acetic acid is difficultly soluble in water and if present in sufficient amounts may precipitate along with the fumaric acid. The two acids cannot be easily separated by recrystallization or extraction with water in view of their similar solubilities.

When the maleic acid to be treated contains impurities, which may react with and convert a certain amount of the inversion agent into a form which is ineffective for promoting the inversion of maleic acid to fumaric acid, it is advantageous to inactivate the impurities thus interfering with the inversion agent by pre-treating the solution of crude maleic acid with urea, as described more fully in Geza E. Neuman de Vegvar application entitled "Maleic Acid Liquor Purification," Serial No. 783,625, filed November 1, 1947, now Patent No. 2,483,576.

The inversion reaction of maleic acid to fumaric acid under fixed conditions initially proceeds quite rapidly and thereafter continues at an increasingly diminishing rate. Almost quantitative yields of fumaric acid may be obtained by extending the time of reaction sufficiently. I have found that the addition of one of my preferred inversion agents to an aqueous solution of maleic acid maintained at a temperature of 70° to 100° C. will invert the maleic acid to the extent of 80% to 100% in a period of 2 to 6 hours.

The process of the present invention may be operated in a batch, semi-continuous or continuous manner. The maleic acid solution during the reaction may be maintained at any temperature between normal atmospheric temperature and that at which maleic acid solution boils but preferably between 70° and 100° C. My preferred inversion agents being soluble in maleic acid solution may be added in solid form or if desired in solution form. The employment of small quantities of inversion agent in the ratio of 0.01 to 0.1 mol inversion agent per mol of maleic acid will not stimulate the exothermic reaction to an uncontrollable activity even at the boiling point of the maleic acid solution. Thus the inversion agent may be added to the maleic acid solution in toto or in portions, as desired.

A preferred method of practicing the present invention comprises introducing solid thiourea in amount of 0.01 to 0.1 mol thiourea per mol maleic acid into an aqueous solution containing 20% to 60% by weight maleic acid. The maleic acid solution is contained in a suitable vessel maintained at a temperature between 70° and 100° C. and atmospheric pressure. A simple conventional stirrer agitates the mixture for 2 to 6 hours. Relatively insoluble fumaric thus formed precipitates and may be separated from the liquor, as by filtration, preferably after cooling the reaction mass to room temperature to minimize the amount of fumaric acid remaining in solution. The fumaric acid thus obtained may be purified in any suitable manner as for example recrystallization from water in the presence of decolorizing carbon.

The invention is illustrated by the following examples wherein parts are by weight unless otherwise stated.

EXAMPLE 1

2.5 parts of thiourea as a 5% aqueous solution were added to a solution of 100 parts of maleic acid in approximately 430 parts of water at room temperature. The mixture was then agitated for 46 hours without temperature control during which an exothermic reaction occurred resulting in a slight heating of the aqueous mass. The reaction mixture was filtered to separate the precipitated fumaric acid as a cake, which was washed with the mother liquor and dried in an oven.

A quantitative yield of fumaric acid was thus obtained. When the reaction mixture was agitated for 5 hours, instead of 46 hours, without otherwise departing from the foregoing procedure, 33 parts of fumaric acid, corresponding to 81.7% of theory, were obtained.

EXAMPLE 2

1.8 parts of thiourea were added to 116 parts by weight of aqueous maleic acid liquor which contained 44 parts of maleic acid together with small amounts of benzoquinone and other impurities, and which was obtained by absorbing in water maleic anhydride-containing gases obtained by the oxidation of benzene vapors with air in the presence of a vanadium pentoxide catalyst. The mixture was agitated at room temperature for approximately 24 hours. The precipitated fumaric acid thus formed was filtered out and the cake washed with the mother liquors and dried. The yield of fumaric acid obtained was 90% of theory.

EXAMPLE 3

42.3 parts of maleic anhydride, obtained by the catalytic air oxidation of benzene vapors and purified by the method described in U. S. Patent 2,343,536 were dissolved in 176 parts of water at 50°-60° C., yielding a solution containing 22.9% by weight, or approximately 30% by volume of maleic acid. A number of such separate solutions were thus prepared. To each solution an inversion agent in an amount shown in Table I below was added and the mixture agitated for several minutes. The mixture was then heated under a reflux condenser to 90°–95° C. for 3 hours. The mass was cooled to room temperature (about 25° C.) during about one hour, allowed to stand overnight (about 18 hours), and filtered. The filter cake of fumaric acid thus obtained was washed with 100 parts of cold water, and dried in an oven at 50° C.

Table I below gives the nature and weight of each inversion agent employed, together with the yields of fumaric acid obtained when operated in accordance with the foregoing general procedure, the ratio of mols of inversion agent to mols of maleic acid being 0.022 to 1 in each case.

Table I

| | Inversion Agent | | Fumaric Acid Recovered, Yield, Per cent [1] |
|---|---|---|---|
| | Name | Amount (Parts by weight) | |
| 1 | Thiourea | 0.75 | 90.8 |
| 2 | N,N'-diethylthiourea | 1.30 | 93.4 |
| 3 | N-allylthiourea | 1.15 | 93.2 |
| 4 | N,N'-di-n-butylthiourea | 1.85 | 89.9 |
| 5 | N-acetyl-thiourea | 1.17 | 87.8 |
| 6 | N-phenylthiourea | 1.50 | 79.4 |
| 7 | No inversion agent | 0 | None |

[1] Based on the weight of initial maleic acid.

Thiourea is particularly preferred as the inversion agent because of its high activity, solubility in maleic acid solutions, availability, relatively low cost, and small quantity required.

Various modifications are possible within the scope of the invention and I do not therefore wish to be limited except by the scope of the following claims.

I claim:

1. A process for converting maleic acid to fumaric acid which comprises subjecting a solution of maleic acid to the action of an inversion agent of the general formula

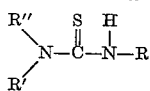

wherein R, R' and R'' represent radicals of the group consisting of hydrogen, hydrocarbon and acyl of the type R'''CO, in which R''' is a hydrocarbon radical, the sum of carbon atoms in radicals R, R' and R'' not exceeding 8.

2. A process for converting maleic acid to fumaric acid which comprises subjecting an aqueous solution of maleic acid at a temperature within the range of from 30° to 110° C. to the action of an inversion agent of the general formula

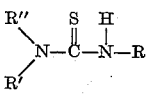

wherein R, R' and R'' represent radicals of the group consisting of hydrogen, hydrocarbon and acyl of the type R'''CO, in which R''' is a hydrocarbon radical, the sum of carbon atoms in radicals R, R' and R'' not exceeding 8.

3. A process for converting maleic acid to fumaric acid which comprises subjecting an aqueous solution of maleic acid to the action of an inversion agent in an amount of 0.01 to about 0.1 mol of inversion agent per mol of maleic acid, said inversion agent having the general formula

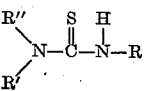

wherein R, R' and R'' represent radicals of the group consisting of hydrogen, hydrocarbon and acyl of the type R'''CO, in which R''' is a hydrocarbon radical, the sum of carbon atoms in radicals R, R' and R'' not exceeding 8.

4. A process for converting maleic acid to fumaric acid which comprises subjecting an aqueous solution of maleic acid at a temperature within the range of from 70° to 100° C. to the action of an inversion agent in an amount of 0.01 to about 0.1 mol of inversion agent per mol of maleic acid, said inversion agent having the general formula

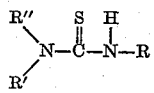

wherein R, R' and R'' represent radicals of the group consisting of hydrogen, hydrocarbon and acyl of the type R'''CO, in which R''' is a hydrocarbon radical, the sum of carbon atoms in radicals R, R' and R'' not exceeding 8.

5. A process for converting maleic acid to fumaric acid which comprises subjecting a solution of maleic acid to the action of thiourea.

6. A process for converting maleic acid to fumaric acid which comprises subjecting an aqueous solution of maleic acid to the action of thiourea in an amount of 0.01 to about 0.1 mol of thiourea per mol of maleic acid and separating a fumaric acid precipitate from the treated solution.

7. A process for converting maleic acid to fumaric acid which comprises subjecting an aqueous solution of maleic acid at a temperature between 30° and 110° C. to the action of thiourea in an amount of 0.01 to about 0.1 mol of thiourea per mol of maleic acid and separating a fumaric acid precipitate from the treated solution.

8. A process for converting maleic acid to fumaric acid which comprises subjecting an aqueous solution of maleic acid at a temperature between 70° and 100° C. to the action of thiourea in an amount of 0.01 to about 0.1 mol of thiourea per mol of maleic acid and separating a fumaric acid precipitate from the treated solution.

9. A method of converting a cis alpha-beta unsaturated dicarboxylic acid to its trans isomer which comprises heating it in an aqueous medium with a compound containing the structural unit

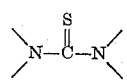

10. A method of converting maleic to fumaric acid which comprises heating in water solution between 50° C. and the boiling point of the solution in the presence of a thiourea.

11. A method of converting maleic to fumaric acid which comprises heating in water solution between 50° C. and the boiling point of the solution in the presence of thiourea.

12. A method of converting a cis alpha-beta unsaturated dicarboxylic acid to its trans isomer which comprises subjecting it to a superatmospheric temperature, in an aqueous medium in the presence of a compound containing the structural unit

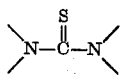

13. A method of converting a cis alpha-beta unsaturated dicarboxylic acid to its trans isomer which comprises subjecting it to a superatmospheric temperature, in an aqueous medium in the presence of a thiourea.

SYDNEY M. SPATZ.

REFERENCES CITED

The following references are of record in the file of this patent:

UNITED STATES PATENTS

| Number | Name | Date |
|--------|------|------|
| 2,404,103 | Scott | July 16, 1946 |

OTHER REFERENCES

Clemo et al., "Jour. Chem. Soc." (London) Pt. 1 (1930), pages 213–215.

Taube, "J. Am. Chem. Soc." vol. 65, page 526 (1943).